(12) United States Patent
Little

(10) Patent No.: US 8,985,637 B1
(45) Date of Patent: Mar. 24, 2015

(54) EXPANSION JOINT AND METHOD

(76) Inventor: Kerry Fredrick Little, Stevenson, AL (US)

( * ) Notice: Subject to any disclaimer, the term of this patent is extended or adjusted under 35 U.S.C. 154(b) by 0 days.

(21) Appl. No.: 12/817,906

(22) Filed: Jun. 17, 2010

Related U.S. Application Data

(60) Provisional application No. 61/187,918, filed on Jun. 17, 2009.

(51) Int. Cl.
*F16L 27/12* (2006.01)

(52) U.S. Cl.
USPC .......................... 285/298; 285/349; 285/424

(58) Field of Classification Search
CPC ........ F16L 9/003; F16L 25/10; F16L 25/0009
USPC .............. 285/424, 183, 368, 302, 145.1, 349, 285/298
See application file for complete search history.

(56) References Cited

U.S. PATENT DOCUMENTS

| | | | | |
|---|---|---|---|---|
| 603,720 A * | 5/1898 | Avery | | 285/10 |
| 2,319,543 A * | 5/1943 | Hall | | 277/619 |
| 2,458,024 A * | 1/1949 | Pinaire | | 285/296.1 |
| 2,497,987 A * | 2/1950 | Goode | | 285/349 |
| 2,828,980 A * | 4/1958 | Craig et al. | | 285/145.1 |
| 4,116,478 A * | 9/1978 | Yamaji et al. | | 285/302 |
| 4,135,742 A * | 1/1979 | Anderson | | 285/87 |
| 4,328,981 A * | 5/1982 | Greene et al. | | 285/288.1 |
| 5,009,455 A * | 4/1991 | Irvine et al. | | 285/106 |
| 5,746,453 A * | 5/1998 | Roberts | | 285/47 |
| 6,131,960 A * | 10/2000 | McHughs | | 285/302 |
| 6,176,526 B1 * | 1/2001 | McRae et al. | | 285/61 |
| 6,715,803 B1 * | 4/2004 | Pahl | | 285/404 |
| 8,220,839 B2 * | 7/2012 | Hall | | 285/302 |
| 2013/0049354 A1 * | 2/2013 | Chase et al. | | 285/93 |
| 2013/0069363 A1 * | 3/2013 | Lutzer | | 285/298 |
| 2013/0181441 A1 * | 7/2013 | Courpet et al. | | 285/145.1 |

* cited by examiner

*Primary Examiner* — Aaron Dunwoody
(74) *Attorney, Agent, or Firm* — Ann I. Dennen; Lanier Ford Shaver & Payne P.C.

(57) ABSTRACT

A sealing apparatus has a first cavity comprised of two separable sections for fastening about a second cavity, and the first cavity comprises a first flange that extends about the cavity's top periphery. The sealing apparatus further has a deformable seal located adjacent an inner surface of the first flange and a clamping seal flange fastened to the first flange adjacent and atop the deformable seal such that the deformable seal deforms as the clamping seal flange is tightened thereby creating pressure on side walls of the second cavity forming a seal.

10 Claims, 4 Drawing Sheets

EXPANSION JOINT AND METHOD

CROSS REFERENCE TO RELATED APPLICATION

This application claims priority to U.S. Patent Application Ser. No. 61/187,918, entitled "Expansion Joint," and filed on Jun. 17, 2009, which is incorporated herein by reference.

BACKGROUND

Oftentimes, the term "joint" refers to an intersection of two pieces of construction materials, for example two pieces of duct. The term "duct" often refers to an elongated cavity, such as a pipe, a tube, a channel, or the like, for example, which carries a substance.

Sometimes, the construction materials near the joint and/or at the joint are subjected to extreme environmental conditions. For example, the construction materials may periodically be subjected to temperature extremes.

If the construction materials are made of metallic materials, temperature extremes can cause the construction materials to expand and contract significantly. If the joint is not designed to accommodate such expansion and contraction, it is possible that the joint will fail causing a leak or some other undesirable effect. In this regard, any substance that is flowing through the construction materials may leak from the joint.

SUMMARY

An expansion joint in accordance with an embodiment of the present disclosure has a first cavity comprised of two separable sections for fastening about a second cavity, and the first cavity comprises a first flange that extends about the cavity's top periphery. The sealing apparatus further has a deformable seal located adjacent an inner surface of the first flange and a clamping seal flange fastened to the first flange adjacent and atop the deformable seal such that the deformable seal deforms as the clamping seal flange is tightened thereby creating pressure on side walls of the second cavity forming a seal.

An expansion joint method comprising placing a deformable seal on an edge of a side wall of a first cavity adjacent a first flange formed in the side wall and installing the first cavity around a second cavity. The method further comprises fastening, via fasteners, a clamping seal flange to the first flange such that the clamping seal flange contacts the deformable seal and tightening the fasteners thereby deforming the deformable seal such that the deformable seal presses against side walls of a second cavity.

DRAWINGS

DETAILED DESCRIPTION

Figure 1:
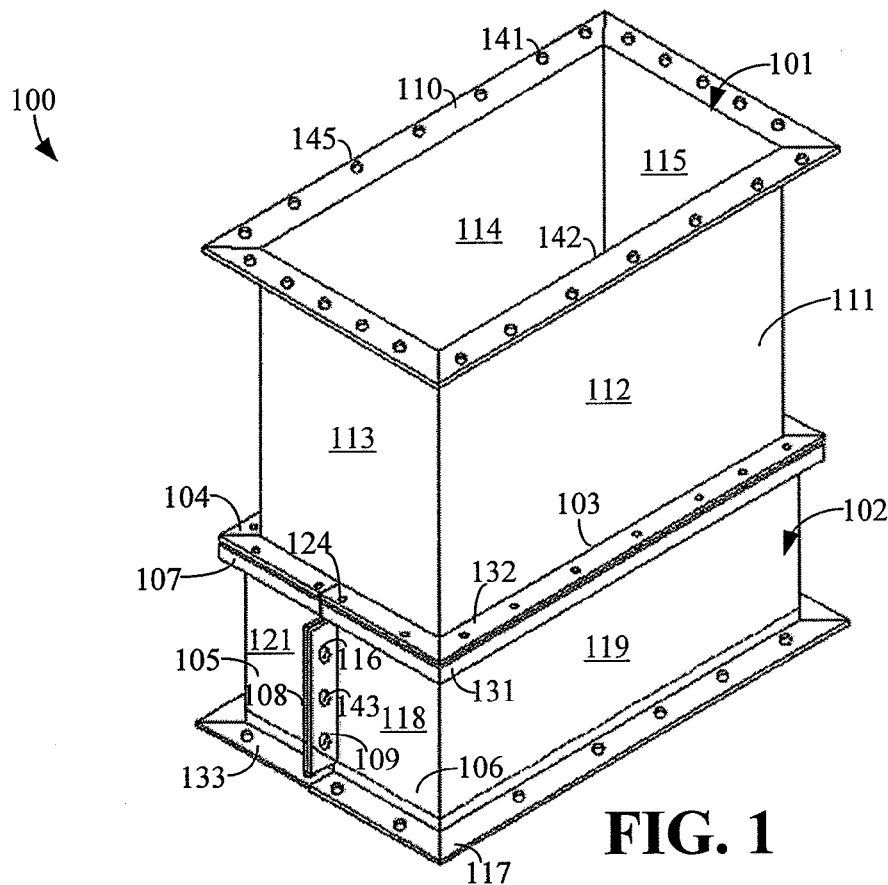
FIG. 1 is a perspective view of an expansion joint in accordance with an exemplary embodiment of the present disclosure.

FIG. 1 depicts an expansion joint 100 in accordance with an exemplary embodiment of the present disclosure. The expansion joint 100 comprises a hollow upstream member 101 and a hollow downstream member 102.

In the exemplary embodiment depicted in FIG. 1, the upstream member 101 and the downstream member 102 are substantially elongated cavities having a cross-sectional rectangular shape. However, it should be noted that other types of cavities exhibiting other cross-sectional shapes, e.g., circular or square, may be used in other embodiments of the present disclosure.

The upstream member 101 comprises a flange 110 for connection to another member (not shown) that extends about the upstream member's top periphery. The other member that is not shown may also have a corresponding flange (not shown) extending about its periphery. The flange 110 and the flange of the other member that is not shown in FIG. 1 would be mated together. In this regard, the upstream member 101 has a plurality of openings 141 in the flange 110 and the flange of the other member would also comprise a plurality of openings that would align with the openings 141 in the flange 110 of the upstream member 101. Thus, fasteners, e.g., bolts and nuts, could be inserted through the openings 141 in the flange 110 and the openings in the other flange to the other member so that the upstream member 101 and the other member would be affixed together.

In addition, the upstream member 101 comprises a body 111 having side walls 112-115. In the embodiment shown in FIG. 1, the body is an elongated cavity having a cross-sectional shape that is substantially rectangular. However, the body 111 may be other types of cavities exhibiting other cross-sectional shapes, e.g., circular or square, in other embodiments of the present disclosure.

The flange 110 comprises an inner edge 142 and an outer edge 145 that extends laterally from the body 111. In one embodiment of the present disclosure, the side walls 112-115 extend from the inner edge 142. In such an embodiment, the side walls 112-115 extend substantially perpendicular (i.e., at ninety degrees (90°)) from the inner edge 142 of the laterally extending flange 110. However, such side walls 112-115 may extend at other angles in other embodiments of the present disclosure. As an example, the side walls 112-115 may be convex relative to the flange 110 and therefore extend from the inner edge 142 of the flange 110 at an angle.

Figure 2:
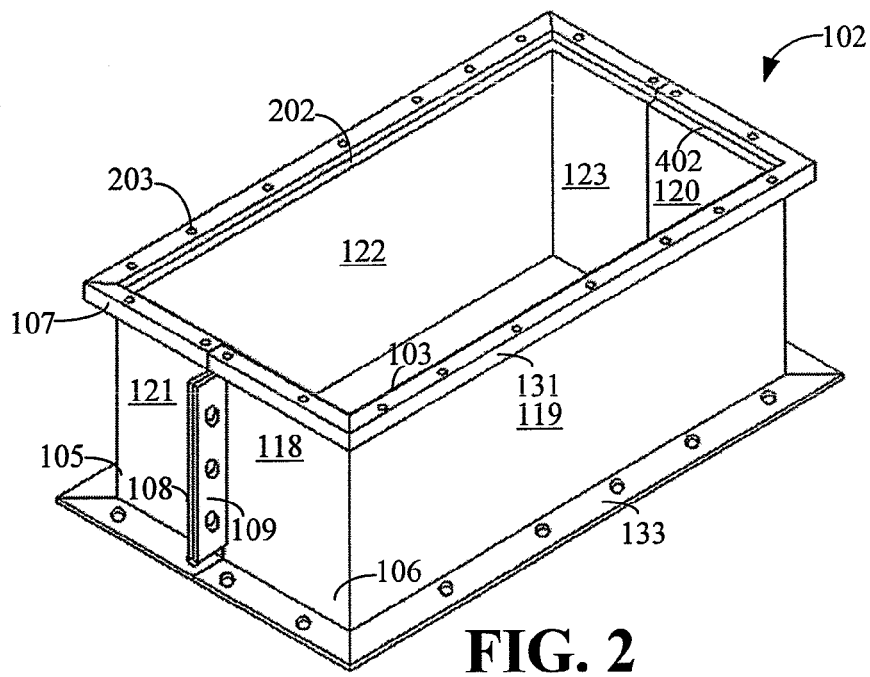
FIG. 2 is a perspective view of the downstream member of the expansion joint shown in FIG. 1.

The downstream member 102 comprises two separable sections 105 and 106. The downstream member section 106 comprises side walls 118, 119, and 120 (FIG. 2). Such side walls 118-120 are substantially formed in a squared u-shape. Notably, the side walls 118-120 may be formed by extruded metal or welded together at seams. However, such side walls 118-120 may be formed together in other ways and may form other shapes in other embodiments.

The downstream member section 105 comprises side walls 121, 122 (FIG. 2), and 123 (FIG. 2). Such side walls 121-123 are substantially formed in a squared u-shape. Notably, the side walls 121-123 may be formed by extruded metal or welded together at seams. However, such side walls 121-123 may be formed together in other ways and may form other shapes in other embodiments.

The separable downstream member section 105 comprises a flange 108 having openings 143 therein. The flange 108 extends outwardly from and perpendicular to the side wall 121. Further, the separable downstream member section 105 comprises another flange (not shown) having openings (not shown) therein on the opposing side of the section 105 that extends outwardly from and perpendicular to the sidewall 123.

In addition, the separable downstream member section 106 comprises a flange 109 having openings 116 therein. The flange 109 extends outwardly from and perpendicular to the side wall 118. Further, the separable downstream member section 106 comprises another flange (not shown) having openings (not shown) therein on the opposing side of the section 106 that extends outwardly from and perpendicular to the sidewall 118.

In order to fasten the separable downstream member sections 105 and 106 together, the two sections 105 and 106 are placed together such that the flanges 108 and 109 and the opposing flanges (not shown) are mated and the openings 143 of the flange 105 and the openings 116 of the flange 109 are aligned (also the openings on the flanges on the opposing sides would be aligned as well). Fasteners, e.g., bolts and nuts, are then inserted through the openings 116 and 143 so that the sections 105 and 106 are coupled together. Other types of fasteners may be used in other embodiments of the present disclosure.

When the two sections 105 and 106 are coupled together, the side walls 118-123 form an elongated cavity, e.g., a duct. Thus, solids, including ash, dust, bark, coal, etc., can flow through the elongated cavity formed by the side walls 118-123.

Each of the sections 105, 106 further comprises flanges 107 and 131, respectively. The flanges 107 and 131 extend outwardly from and substantially perpendicular to the side walls 118-123. Further, the flanges 107 and 131 have a plurality of openings (not shown). The flanges 107 and 131 extend about the top periphery of the cavity formed by the side walls 118-123.

In addition, there are separate clamping seal flanges 104 and 132. The separate clamping seal flanges 104 and 132 comprise a plurality of openings 124. The flanges 107 and 131 are mated with and coupled to the clamping seal flanges 104 and 132, respectively. In this regard, when the openings 123 of the clamping seal flanges 104 and 132 are aligned with the openings in the flanges 107 and 131 fasteners, e.g., bolts and nuts, are inserted through the aligned openings 124 and openings (not shown) in the flanges 107 and 131. Thus, the clamping seal flanges 104 and 132 are coupled to the flanges 107 and 131. Note that while bolts and nuts are described as the types of fasteners used to couple the various flanges together, other types of fasteners are possible in other embodiments of the present disclosure.

In order to connect the downstream member 102 to the upstream member 101, the separable downstream member sections 105 and 106 are separated. The sections 105 and 106 are then installed around the side walls 112-115 of the upstream member 101. The fasteners (not shown) are then inserted through the aligned openings 116 and 143 in the flanges 109 and 108, respectively. In addition, fasteners (not shown) are also inserted through the aligned openings (not shown) in the flanges (not shown) on the opposing sides of the downstream member 102.

As will be described further herein, a deformable seal 502 (shown in FIG. 5) is inserted adjacent the flanges 107 and 131 and the clamping seal flanges 104, 132. In particular, the deformable seal 502 is located adjacent an inside surface of the flanges 107 and 131. The deformable seal 502 is made of a pliable material, such as, for example, Teflon-impregnated packing material.

The clamping seal flanges 104, 132 are secured to the flanges 107, 131 by inserting and tightening the fasteners into the openings 124. As the fasteners are tightened, the clamping seal flanges 104 and 132 are forced closer and closer to the flanges 107 and 131. As the clamping seal flanges 104 and 132 are forced closer and closer to the flanges 107 and 131, the clamping seal flanges 104 and 132 also exert pressure on the deformable seal 502 that is pushed against the side walls 112-115 of the upstream member 101 thereby retaining the upstream member 101 in relation to the downstream member, and when the deformable seal 502 is pressed against the side walls 112-115, the deformable seal 502 prevents contents within the elongated cavities formed by the side walls 112-115 and side walls 118-123 from escaping.

The upstream member 101 and the downstream member 102 are made of any type of material known in the art or future developed for carrying various materials and/or substances, such as solids. As an example, the upstream member may be made of steel, which expands and contracts in response to extreme temperature changes. If the connection between the growing member and the stationary equipment were rigid, damage would result from the inability to compensate for thermal growth. However, the design of expansion joint 100 is not rigid, thus allowing for thermal growth, permitting the upstream member 101 and/or the downstream member 102 to expand and/or contract while still remaining coupled together.

FIG. 2 depicts the downstream member 102 separated from the upstream member 101 (FIG. 1). As noted hereinabove, the downstream member 102 comprises the flanges 107 and 131, and the clamping seal flanges 104 (FIG. 1) and 132 (FIG. 1) couple to the flanges 107 and 131 when installing the expansion joint 100. However, FIG. 2 shows the clamping seal flanges 104 (FIG. 1) and 132 (FIG. 1) removed from the downstream member 102. Notably, there is a plurality of openings 203 in the flange 107 and the flange 131, and the openings 203 are for receiving fasteners (not shown) for fastening the clamping seal flanges 104 and 132 to the flanges 107 and 131.

As noted hereinabove, the downstream member 102 has two sections 105 and 106. Note that two sections 105 and 106 are shown in the exemplary embodiment. However, other numbers of sections may be possible in other embodiments. For example, the expansion joint 100 may be made up of four sections where each of the sections is fastened to another section via one or more flanges extending there from.

Section 105 comprises side walls 121, 122, and 123, which extend substantially perpendicular from the flange 107 to a flange 133. Further, section 106 comprises side walls 118, 119, and 120, which extend substantially perpendicular from the flange 131 to a flange 117. Note that the side walls 118-120 may extend at other angles in other embodiments of the present disclosure. When the sections 105, 106 are coupled together via the flanges 108 and 109 and the flanges (not shown) on the opposing side of the downstream member 102, the side walls 118-123 form a duct through which solids, including ash, dust, bark, coal, etc., can flow.

The deformable seal 502 (FIG. 5) sits on a ledge 402 formed by the side walls 118-120 and a ledge 202 formed by the side walls 121-123. The ledges 202 and 402 extend along the top edges of the side walls 121-123 and 118-120, respectively.

As will be described further herein, the flanges 107 and 131 and the clamping seal flanges 104 and 132 contact the deformable seal 502, thereby sealing the chamber formed by the members 101 and 102. In this regard, as the clamping seal flanges 104 and 132 are tightened thereby pressing on the deformable seal 502, the deformable seal 502 expands outwardly toward and against the side walls 112-115 (FIG. 1) of the upstream member 101 thereby forming a seal between the upstream member 101 and the downstream member 102.

Figure 3:
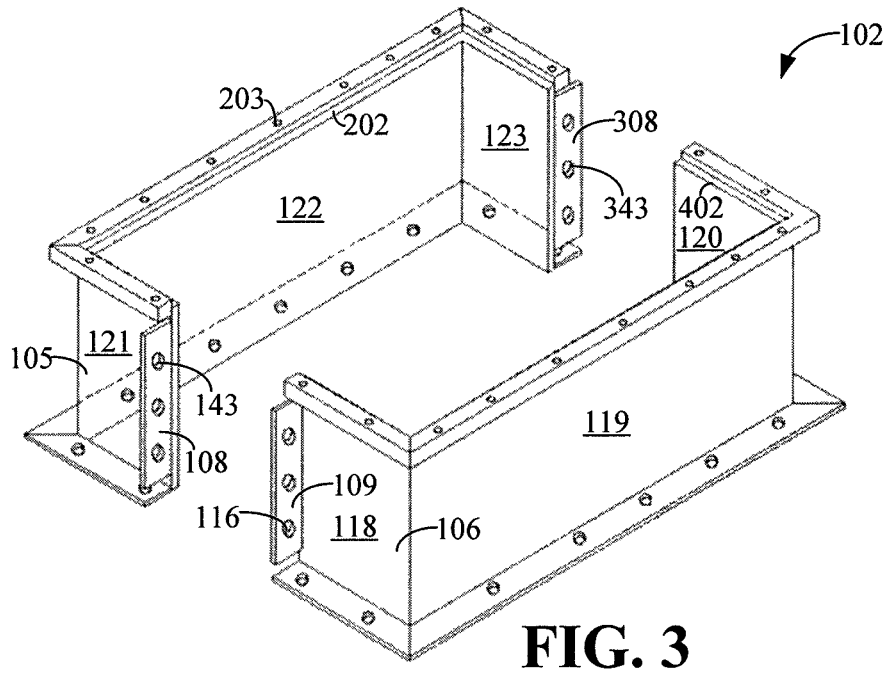
FIG. 3 is a perspective view of the downstream member of FIG. 2 separated into two sections.

FIG. 3 depicts the sections 105 and 106 separated one from the other. Having sections 105 and 106 that are separable in this fashion allows ease of installation, as described above, because the sections 105 and 106 can be placed around or about the upstream member 101 then the sections 105 and 106 can be secured in place.

In this regard, the sections 105 and 106 may be placed about the upstream member 101 (FIG. 1), and while being held in place, the fasteners (not shown) can be installed into the openings 116 of flange 109 that extends from side wall 118 and corresponding openings 143 of flange 108 that extends from side wall 121.

In addition, the view of section 105 in FIG. 3 depicts an opposing flange 308 and corresponding openings 343 formed in the flange 308 that extends from the side wall 123. Note that there is also a flange (not shown) that extends from the side wall 120. Thus, when securing the sections 105 and 106 about the upstream member 101 fasteners are also inserted through the openings (not shown) in the flange (not shown) that extends from side wall 120 and the openings 343 in the flange 308 that extends from side wall 123.

In addition, FIG. 3 shows the ledge 202 that is formed on the upper edge of the side walls 121-123 and the ledge 402 that is formed on the upper edge of the side walls 118-120. The deformable seal 502 (FIG. 5) sits upon the ledges 202 and 402.

Figure 4:
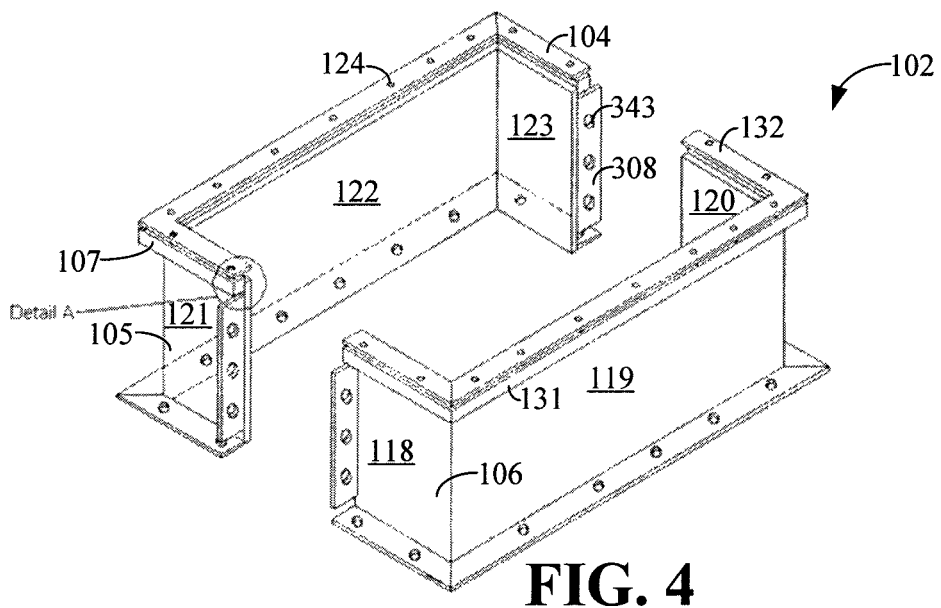
FIG. 4 is a perspective view of the downstream member of FIG. 1 separated into two sections and coupled to a clamping seal flange.

FIG. 4 depicts the sections 105 and 106 separated similar to FIG. 3. However, in FIG. 4, the clamping flanges 107 and 132 are installed atop the flanges 107 and 131.

In this regard, the clamping seal flange 104 is coupled to the flange 107 via one or more fasteners that are inserted through openings 124 in the clamping seal flange 104 and through the openings 203 in the flange 107. In addition, the clamping seal flange 132 is coupled to the flange 131 via one or more fasteners that are inserted through openings 123 in the clamping seal flange 132 and through the openings 203 in the flange 131.

Figure 5:
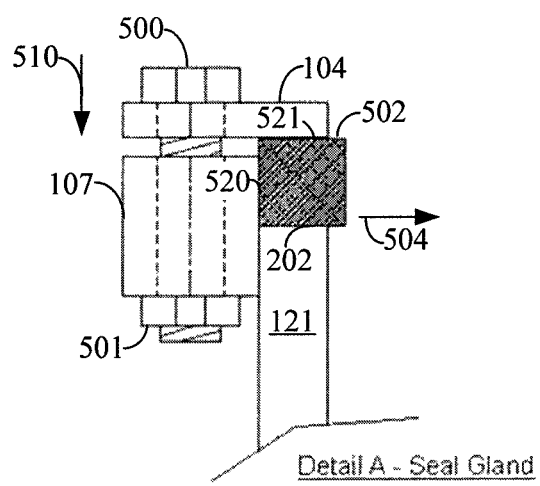
FIG. 5 is a side plan view of a portion of the downstream member of FIG. 4 taken along Detail "A."

FIG. 5 depicts "Detail A" of FIG. 4 showing a cross sectional view of a portion of the downstream member 102. FIG. 5 depicts the flange 107 formed with the side wall 121. In this regard, the flange 107 may be formed with the side wall 120 through extrusion or the flange 107 may be welded to the side wall 121. Note that the flange 107 may be coupled to the side wall 121 in any manner known in the art or future-developed in other embodiments.

Note that the flange 107 is formed with the side wall 121 such that an inner surface 520 of the flange is exposed. The deformable seal 502 is located adjacent the inner surface 520 of the flange 107. Further, the cross-sectional shape of the clamping seal flange 104 is rectangular, and a portion of the clamping seal flange 104 extends inwardly beyond the inner surface 520 of the flange 107 such that an inner surface 521 of the clamping seal flange 104 is adjacent and atop the deformable seal 502. In this regard, the width of the clamping seal flange 104 is greater than the width of the flange 107. Thus the inner surface 521 of the clamping seal flange 104, the inner surface 520 of the flange 104 and the ledge 202 form a groove in which the deformable seal 502 is retained.

Situated on the ledge 202 of the side wall 121 is the deformable seal 502. In one embodiment, the deformable seal 502 rests on the ledge 202. However, in other embodiments, the deformable seal 502 may be affixed to the ledge 202 via adhesive or the like. As indicated hereinabove, the deformable seal 502 may be for example, Teflon-impregnated packing material, but other types of materials are possible in other embodiments of the present disclosure.

The clamping seal flange 104 is secured to the flange 107 via a fastener, such as a bolt 500 and a nut 501, as shown by FIG. 5. As the fastener is tightened, the clamping seal flange 104 moves downward toward the flange 107 in a direction indicated by reference arrow 510. As the flanges 104 and 107 move closer together, the flange 104 presses against the deformable seal 502, thereby squeezing the deformable seal 502. As more force is applied to the deformable seal 502 by the flange 104, the deformable seal 502 deforms such that the deformable seal 502 is forced outwardly in a direction indicated by reference arrow 504.

Therefore, when the clamping seal flange 104 is tightened onto the flange 107, the deformable seal 502 deforms and seals the chamber formed between the upstream member 101 and the downstream member 102. If during use the upstream member 101 expands and/or contracts due to extreme environmental conditions, the deformable seal 502 allows the upstream member 101 to expand and/or contract without breaking the seal created by the deformable seal 502.

Note that Detail A and its corresponding description discuss only information related to the clamping seal flange 104, the flange 107, and the side wall 121. However the deformable seal 502 extends around the ledge 202 on the side walls 122 and 123, and the clamping seal flange 104 works substantially identical to as it is described hereinabove with reference to side wall 121. In addition, the deformable seal 502 extends around the ledge 402 that is formed on the side walls 118-120, and the clamping seal flange 132, the flange 131, and the side walls 118-120 also work substantially identical to as it is described hereinabove with reference to side wall 121.

Therefore, as the clamping seal flange 104 is tightened onto the flange 107, the deformable seal 502 exerts an inward pressure on the upstream member 102 (FIG. 1) along each of the side walls 121-123. In addition, as the clamping seal flange 132 is tightened onto the flange 131, the deformable seal 502 exerts an inward pressure on the upstream member 102 along each of the side walls 118-120.

Figure 6:
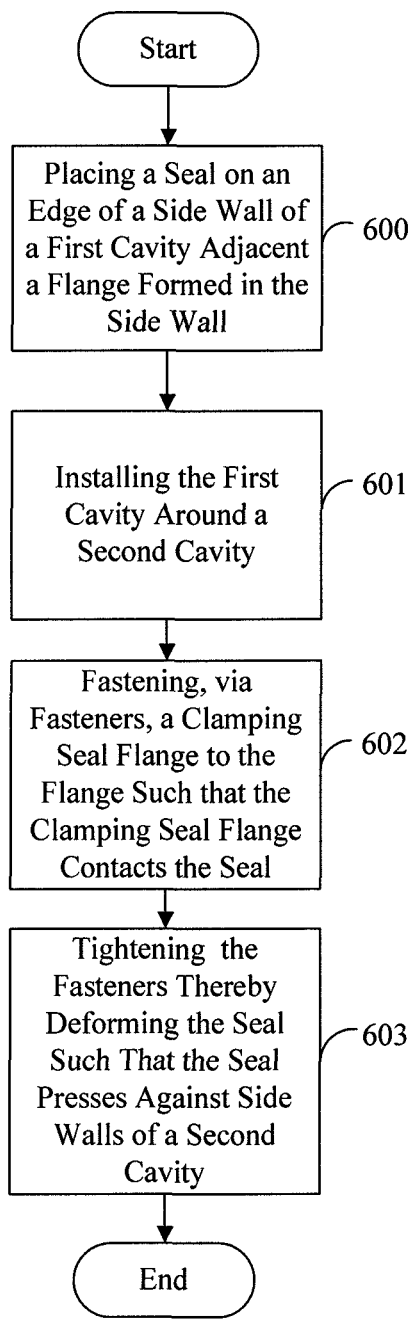
FIG. 6 is a flowchart of an exemplary method in accordance with an embodiment of the present disclosure.

A method in accordance with an exemplary embodiment of the present disclosure is described with reference to FIG. 6. The first step 600 is placing a deformable seal 502 (FIG. 5) on a ledge 202 (FIG. 2) and 402 (FIG. 2) formed by the side walls 121-123 (FIG. 2) and side walls 118-120 (FIG. 2) of a downstream member 102 (FIG. 1) adjacent a flange 107 (FIG. 1) and a flange 131 (FIG. 1) respectively. As described herein, this deformable seal 502 can be merely placed on the ledge 202 or it can be fastened to the ledge 202 and 402, for example, via an adhesive.

The next step 601 is installing the downstream member 102 around an upstream member 101. This step is performed as described with reference to FIG. 3. In this regard, the downstream member 102 is made up of two separate sections 105 (FIG. 3) and 106 (FIG. 3). They are placed around the upstream member 101 and fastened together by flanges 108 (FIG. 3) and 109 (FIG. 3) and opposing flanges 308 (FIG. 3) and another flange (not shown).

The next step 602 is fastening a clamping seal flange 104 (FIG. 1) and a clamping seal flange 132 (FIG. 1) to the flange 107 and the flange 131 (FIG. 1) such that the clamping seal flanges 104 and 132 contact the deformable seal 502. Fastening can be effectuated via a bolt 500 (FIG. 5) and nut 501 (FIG. 5) or any other type of fastener known in the art. The final step 603 is tightening the fasteners thereby creating a seal of the chamber formed by the upstream member 101 and the downstream member 102.

Note that the expansion joint 100 is shown having a substantially rectangular and/or square shape. However, other shapes are possible in other embodiments. For example, the present disclosure applies as well to ducts that are substantially circular and/or round in shape.

The invention claimed is:

1. An expansion joint, comprising:
   a first hollow member comprising a plurality of adjoining walls that define a first cavity;
   a second hollow member comprising a plurality of adjoining walls that define a second cavity, the second hollow member configured to receive each of the plurality of adjoining walls of the first hollow member such that when the first hollow member and the second hollow member are coupled together an extended cavity is formed defined by the plurality of adjoining walls that define the first cavity and the plurality of adjoining walls that define the second cavity, the second hollow member further comprising a flange that is integral with and protrudes from an outer surface of the plurality of adjoining walls that define the second cavity, the flange and the adjoining walls forming an inner L-shaped ledge;
   a deformable seal coupled to the L-shaped inner ledge;
   a clamping seal flange not integral with the first or second hollow cavities, the clamping seal flange fastened to the second hollow member flange in contact with the deformable seal sitting on the L-shaped ledge such that the deformable seal deforms as the clamping seal flange is tightened to the second hollow member flange creating pressure on outside surfaces of the plurality of adjoining walls of the first hollow member thereby retaining the first hollow member within the plurality of adjoining walls of the second hollow member and forming a seal.

2. The expansion of claim 1, wherein the cross-sectional shape of the first hollow member is a rectangle.

3. The expansion joint of claim 2, wherein the cross-sectional shape of the second hollow member is a rectangle.

4. The expansion joint of claim 1, wherein the second hollow member comprises a plurality of side wall sections forming a rectangle, each of the side wall sections having a top edge forming the inner ledge.

5. The expansion joint of claim 4, wherein the flange is formed with an outer surface of the plurality of adjoining walls such that an inner surface of the flange is inwardly exposed toward forming the ledge.

6. The expansion joint of claim 1, wherein the clamping seal flange has a width that is greater than a width of the flange.

7. The expansion joint of claim 6, wherein the clamping seal flange has a clamping seal flange inner surface that is inwardly exposed toward the ledge and the flange inner surface.

8. The expansion joint of claim 7, wherein the flange inner surface, the clamping seal flange inner surface, and the ledge create a groove in which the deformable seal is retained.

9. The expansion joint of claim 8, wherein as the clamping seal flange is fastened to the first flange the clamping seal flange inner surface presses downwardly on the deformable seal such that the deformable seal expands in a direction toward the plurality of adjoining walls of the first hollow member.

10. The expansion joint of claim 1, wherein the deformable seal is affixed to the second hollow member via an adhesive material.

* * * * *